UNITED STATES PATENT OFFICE.

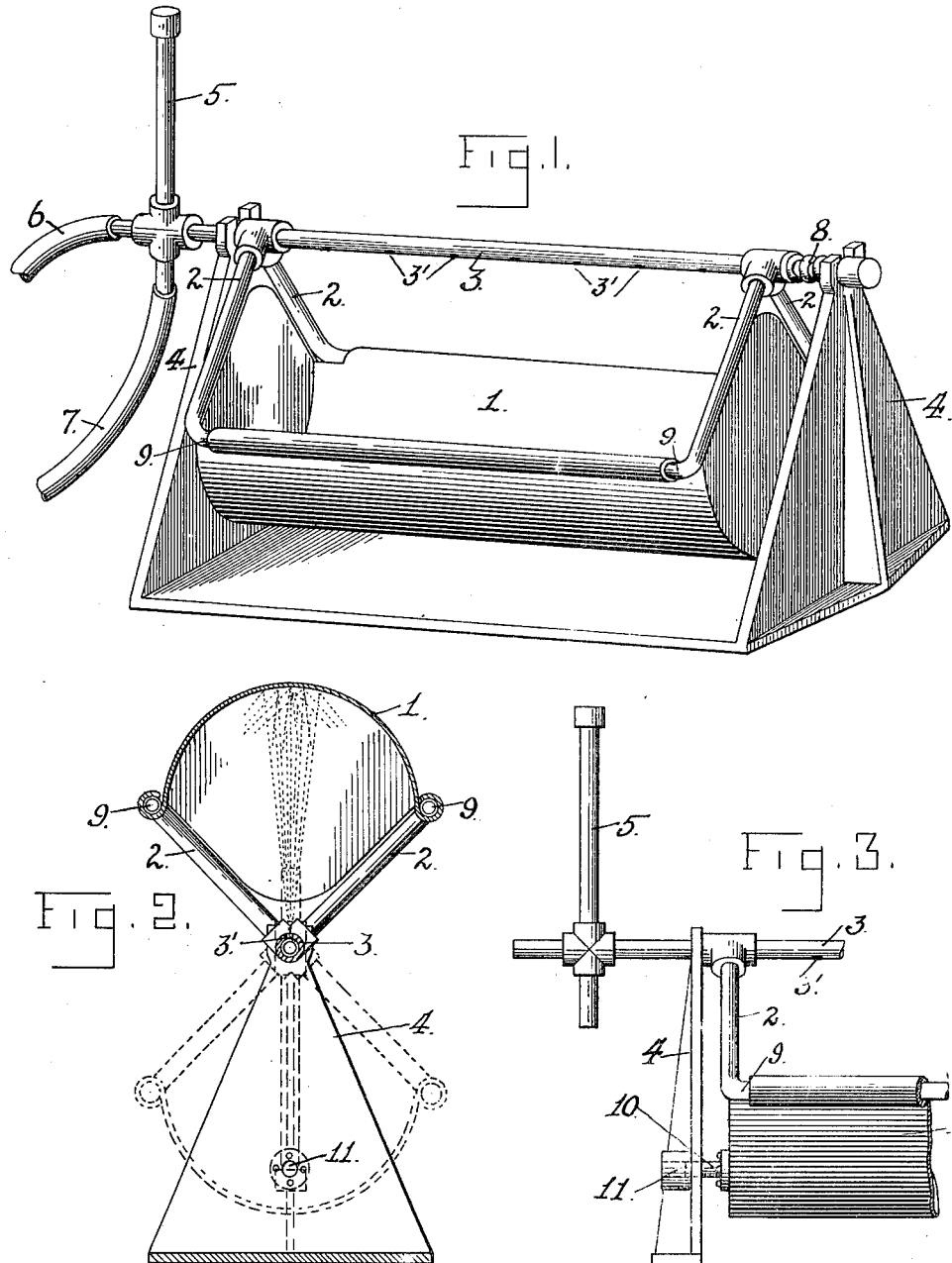

EMANUEL P. ROSE, OF GILROY, CALIFORNIA.

SELF-CLEANING WATERING OR FEED TROUGH.

1,037,054.  Specification of Letters Patent.  Patented Aug. 27, 1912.

Application filed December 14, 1911. Serial No. 665,786.

*To all whom it may concern:*

Be it known that I, EMANUEL P. ROSE, a citizen of the United States, residing at Gilroy, in the county of Santa Clara and State of California, have invented certain new and useful Improvements in Self-Cleaning Watering or Feed Troughs, of which the following is a specification.

My invention relates to the class of watering or feed troughs and particularly to troughs of the invertible type.

The object of my invention is to provide for the easy and effective self-cleaning of the trough; to which end my invention consists in the novel trough which I shall hereinafter fully describe by reference to the accompanying drawings, in which—

Figure 1 is a perspective view of the trough. Fig. 2 is a cross section, showing the trough inverted for the purpose of cleaning it by the water sprays. The dotted lines show the trough in normal position. Fig. 3 is a fragmentary side elevation showing the locking means at one end of the trough.

The trough 1 is suspended by end brackets 2 from a pipe 3 to which the brackets are rigidly secured. The brackets 2 are symmetrical so that the pipe 3 lies above the trough in its longitudinal median plane, and said brackets, in practice, are best formed of pipes which, with their horizontal portions 9, over which the edges of the sheet metal trough are bent, form a supporting frame. The pipe 3, throughout its length over the trough is provided with apertures 3' in its lower semi-circumference, which are adapted to project jets or streams of liquid into the trough. The pipe 3 is journaled to turn and to slide endwise in end supports 4, and one end of said pipe is provided with a handle 5, by which the turning may be effected.

6 is a hose which supplies the pipe 3 with water. The hose 6 may be supposed to connect with any suitable source of water under head or pressure.

7 is another hose, adapted to supply the pipe 3 with any liquid food, say, for example, milk.

8 is a spring at one end of the trough, which holds the trough over to a lock at its other end. This lock may be of any suitable nature. I have here shown it as consisting of a stud 10 on the trough end, entering a socket 11 in the end support 4.

The trough is used and operated as follows:—Normally it hangs right side up and is locked in this position by the spring 8 and the stud and socket 10—11. Feeding animals, such as pigs, subjecting it to rough usage, cannot move it or tilt it and thereby lose its contents. Either water or liquid food may be supplied to the trough through the apertured pipe 3. When the trough is to be cleaned, the handle 5 is grasped and the trough is pushed over lengthwise against the spring 8, until the stud 10 is released from the socket 11. Thereupon the handle is operated to give the pipe 3 a half turn. As the trough is rigidly secured to the pipe 3, said trough will be revolved about said pipe as a center, until it reaches an inverted position above the pipe, as shown in Fig. 2. The water from said pipe 3 now plays upward into the inverted trough and cleans it out effectually. When this is done, the trough is allowed to return to normal position, in which it automatically locks itself.

Having thus described my invention what I claim as new and desire to secure by Letters Patent is—

1. A watering or feed trough consisting of a trough; a combined water feed and clean-out pipe above and extending the length of the trough, said pipe having apertures in its lower semi-circumference; a rigid connection between the trough and pipe; bearings in which the pipe is journaled to turn, whereby the trough may be inverted; means for connecting said pipe with a source of water under pressure, whereby water can be fed therethrough to fill the trough when the same is in normal position and to clean the same when it is moved to an inverted position.

2. A watering or feed trough consisting of a trough; a pipe above and extending the length of the trough, said pipe having apertures in its lower semi-circumference; a rigid connection between the trough and pipe; bearings in which the pipe is mounted to slide longitudinally and to turn on its axis, whereby the trough may be moved endwise and inverted; a lock to hold the trough in normal position and adapted to be broken by the endwise movement of the trough; and means for connecting said pipe from a source of water under pressure, whereby water can be fed therethrough to fill the trough when the same is in normal position and to clean the same when it is moved to an inverted position.

3. A watering or feed trough consisting of a trough; a pipe above and extending the length of the trough, said pipe having apertures in its lower semi-circumference; a rigid connection between the trough and pipe; bearings in which the pipe is mounted to slide longitudinally and to turn on its axis, whereby the trough may be moved endwise and inverted; a lock to hold the trough in normal position and adapted to be broken by the endwise movement of the trough; a spring to return the trough endwise to its normal locked position; and means for connecting said pipe with a source of water under pressure, whereby water can be fed therethrough to fill the trough when the same is in normal position and to clean the same when it is moved to an inverted position.

4. A watering or feed trough consisting of a trough; a bracket at each end of the trough; a pipe to which the brackets are rigidly secured, said pipe lying above and in the median longitudinal plane of the trough and having its lower side apertured; bearings in which said pipe is journaled to turn, whereby the trough may be inverted; a handle to turn said pipe; and means for connecting said pipe with a source of water under pressure, whereby water can be fed therethrough to fill the trough when the same is in normal position and to clean the same when it is moved to an inverted position.

5. A watering or feed trough consisting of a trough; a bracket at each end of the trough; a pipe to which the brackets are rigidly secured, said pipe lying above and in the median longitudinal plane of the trough and having its lower side apertured; bearings in which said pipe is mounted to slide longitudinally and to turn in its axis, whereby the trough may be moved endwise and inverted; a handle to turn said pipe; a lock at one end of the trough to hold said trough in normal position, said lock being adapted to be made and broken by the endwise movement of the trough; and means for connecting said pipe with a source of water under pressure, whereby water can be fed therethrough to fill the trough when the same is in normal position and to clean the same when it is moved to an inverted position.

6. A watering or feed trough consisting of a trough; a bracket at each end of the trough; a pipe to which the brackets are rigidly secured, said pipe lying above and in the median longitudinal plane of the trough and having its lower side apertured; bearings in which said pipe is mounted to slide longitudinally and to turn in its axis whereby the trough may be moved endwise and inverted; a handle to turn said pipe; a lock at one end of the trough to hold said trough in normal position, said lock being adapted to be made and broken by the endwise movement of the trough; a spring at the other end of the trough to return said trough endwise to its normal locked position; and means for connecting said pipe with a source of water under pressure, whereby water can be fed therethrough to fill the trough when the same is in normal position and to clean the same when it is moved to an inverted position.

In testimony whereof I have signed my name to this specification in the presence of two subscribing witnesses.

EMANUEL P. ROSE.

Witnesses:
 WALTER G. FITZGERALD,
 M. C. FITZGERALD.